United States Patent Office 2,884,317
Patented Apr. 28, 1959

2,884,317

HERBICIDAL COMPOSITION AND A METHOD FOR KILLING UNDESIRED VEGETATION THEREWITH

John F. Harris, Jr., Wilmington, Del., assignor to E. I. du Pont de Nemours and Company, Wilmington, Del., a corporation of Delaware No Drawing. Application August 27, 1956
Serial No. 606,185

6 Claims. (Cl. 71—2.6)

This invention relates to herbicidal methods employing certain aryl carboxyalkyl disulfides as active ingredients.

It has been found that aryl carboxyalkyl disulfides of the following type possess outstanding herbicidal activity:

(1)

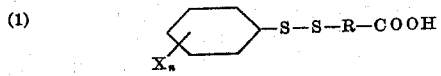

and the salts, esters and amides thereof, wherein X is selected from the group consisting of hydrogen, halogens and alkyl groups containing less than 5 carbon atoms; $n$ is a positive integer less than 4; and R is an alkylene group containing less than 8 carbon atoms. When these compounds are applied to undesired vegetation, excellent herbicidal control is obtained.

The disulfides of the above formula can be prepared by a variety of known methods. For example, they can be prepared by reacting substantially equimolecular portions of a sulfenyl halide with a mercapto acid in accordance with the following equation:

(2)

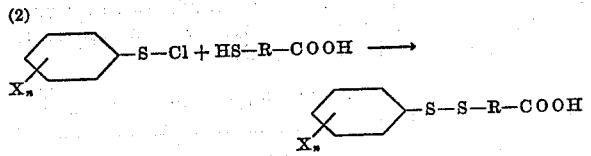

wherein X, $n$ and R have the same significance as in Formula 1.

Illustrative of the compounds employed in the herbicidal methods of this invention are the following:

(1) (Phenyldithio)acetic acid
(2) (p-Chlorophenyldithio)acetic acid
(3) (p-Tolyldithio)acetic acid
(4) (p-Tert. butylphenyldithio)acetic acid
(5) (2,4-dichlorophenyldithio)acetic acid
(6) (2-chloro-4-ethylphenyldithio)acetic acid
(7) (2,4,5-trichlorophenyldithio)acetic acid
(8) (2,4,6-trichlorophenyldithio)acetic acid
(9) 3-(2,4-dichlorophenyldithio)propionic acid
(10) 3-(4-chloro-o-tolyldithio)propionic acid
(11) 3-(3-chlorophenyldithio)propionic acid
(12) (3-chlorophenyldithio)acetic acid
(13) 8-(phenyldithio)octanoic acid
(14) 4-(2,4-dichlorophenyldithio)butyric acid, methyl ester
(15) 6-(4-butyl-2-chlorophenyldithio)hexanamide
(16) 3-(2,4-dichlorophenyldithio)propionic acid, ethyl ester
(17) (4-chlorophenyldithio)acetic acid, isopropyl ester
(18) (4-chloro-2-ethylphenyldithio)acetic acid, tert. butyl ester
(19) 7-(2,4-dichlorophenyldithio) - N,N-dimethylheptanamide
(20) 8-(2,4-dichlorophenyldithio)octanoic acid
(21) 5-(2,4-dichlorophenyldithio)valeric acid
(22) (2-chloro-p-tolyldithio)acetic acid
(23) 4-(2,4-dichlorophenyldithio)butyric acid, methyl ester
(24) 6-(3-chlorophenyldithio)hexanoic acid
(25) 5-(2,4,5-trichlorophenyldithio)valeric acid, methyl ester
(26) 4-(o-chlorophenyldithio)butyric acid
(27) 7-(phenyldithio)-N,N-dimethylheptanamide
(28) (3-chlorophenyldithio)acetic acid, isopropyl ester
(29) 3-(3,4-dichlorophenyldithio)propionic acid, isopropyl ester
(30) (4-chloro-o-tolyldithio)acetic acid
(31) 8-(4-n-butyl - 2-chlorophenyldithio)octanoic acid, methyl ester
(32) 7-(3-chlorophenyldithio)heptanoic acid
(33) (2,4,6-trichlorophenyldithio)acetic acid In order to utilize the herbicidal activity of the compounds of Formula 1 to the best advantage, ordinarily they are formulated by admixture with a conventional carrier material or conditioning agent. This provides formulations adapted for ready and efficient application to soil, weeds, or unwanted plants using conventional applicator equipment. Thus, for the practice of the present method, the compounds of Formula 1 above can be formulated into herbicidal compositions such as those disclosed in Todd U.S. patents, Nos. 2,655,444–447.

Pest control adjuvants such as dusts, solvents, wetting, dispersing and emulsifying agents set out in U.S. Patent 2,426,417 can be employed in preparing the herbicidal compositions of the present invention. Other wetting, dispersing, and emulsifying agents such as those listed in detail in Bulletin E 607 of the Bureau of Entomology and Plant Quarantine of the U.S. Department of Agriculture, and such as those set out in an article by McCutcheon in Soap and Chemical Specialties, July-October 1955, entitled "Synthetic Detergents and Emulsifiers," can also be used.

The preferred herbicidal compositions of the present invention are in the form of water dispersible powders. These can be prepared by admixing one or more of the substituted organodisulfides with a surface-active dispersing agent and a finely divided solid carrier or dust such as talc, pyrophyllite, natural clays, diatomaceous earths and other powdered diluents such as those set out in the aforementioned U.S. patent. The surface-active dispersing agent is used in amount sufficient to impart water dispersibility to the powder.

Dust compositions can be prepared by admixing one or more of the substituted organodisulfides with a finely divided carrier such as those set forth in the aforementioned U.S. patent.

Liquid herbicidal compositions can be prepared by intimately dispersing one or more of the substituted organodisulfides in a conventional liquid herbicidal carrier. Thus those that are sufficiently water soluble can be applied simply in water solution. It is preferred, however, that the compounds be extended with a carrier material or conditioning agent of the kind used and commonly referred to in the art as a herbicidal adjuvant or modifier. Such adjuvants are inert solids, surface-active agents and organic liquids.

The compounds shown above will be included in such compositions in sufficient amount so that they can exert a herbicidal effect. Usually from about 1 to 95% by weight of the compounds are included in such formulations.

Solid formulations can be prepared with inert powders. The formulations thus can be homogeneous powders that either can be used as such, diluted with inert solids to form dusts, or suspended in a suitable liquid medium for spray application. The powders usually comprise active ingredient admixed with minor amounts of conditioning agent. Natural clays, either absorptive such as attapulgite or relatively non-absorptive such as china clays, diatomaceous earth, walnut shell flour, redwood flour, synthetic fine silica, calcium silicate and other inert solid carriers of the kind conventionally employed in powder fungicidal compositions can be used. The active ingredient usually makes up from about 25–90% of these powder compositions. The solids ordinarily should be very finely divided and should have a particle size below about 50 microns and preferably below about 20 microns. For conversion of the powders to dusts, talc, pyrophyllite, tobacco dust, volcanic ash and other dense, rapid-settling inert solids customarily are used.

If the active compound used is water soluble, it can be sprayed or in any other desired manner applied to an absorptive powder which can then be dried to produce a dry product. Any of the above absorptive materials can be used for the preparation of such products.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alcohols, alkylated naphthalene, glycols and ketones such as diisobutyl ketone, cyclohexanone, etc. The active ingredient usually makes up from about 0.5 to 50% of these liquid compositions. Some of these compositions are designed to be used as such, and others to be extended with large quantities of water.

The herbicidal method of the present invention comprises applying an aryl carboxyalkyl disulfide of Formula 1, ordinarily in a herbicidal composition of the aforementioned type, to the locus or area to be protected from undesirable plant growth. The active compound is, of course, applied in sufficient amount to exert the desired herbicidal action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is, of course, dependent upon the particular active ingredient employed, the nature of the formulation used, the type of treatment, the type of vegetation to be controlled, climatic conditions and the like. In general, when applied as a foliar spray, a dosage of about 20 to 60 pounds per acre is used.

This method is applicable to the control of both broadleaf and grassy annual and perennial weeds, such as yellow foxtail, Johnson grass, wild mustard, dandelion and lamb's-quarters. It has particular utility as a contact agent for the control of annual broad leaves such as lamb's-quarters, ragweed, pigweed and annual grassy weeds, such as yellow foxtail and crabgrass.

In order that the invention can be better understood, the following examples are given in addition to those set forth above:

Example 1

This example demonstrates the practice of the present method employing wettable powder herbicidal compositions containing as an active ingredient a compound of Formula 1. The wettable powder compositions are prepared by combining the dry ingredients, blending in a ribbon blender, micropulverizing in a hammer mill until substantially all of the product is below 50 microns in particle size, and reblending the product in a ribbon blender to give a free flowing powder that is readily dispersible in water to form dilute sprayable formulations.

|   | Percent |
|---|---|
| A. (Phenyldithio)acetic acid | 80 |
| Calcium silicate | 18.75 |
| Alkyl aryl sulfonate | 1.0 |
| Methyl cellulose | 0.25 |
| B. 3-(o-chlorophenyldithio)propionic acid, ammonium salt | 50 |
| Bentonite | 20 |
| Diatomaceous earth | 30 |
| C. (2-chloro-4-ethylphenyldithio)acetic acid | 75 |
| Synthetic silica | 23.5 |
| Sodium lignin sulfonate | 1.0 |
| Ester of sodium isethionate | 0.5 |
| D. (2,4,5-trichlorophenyldithio)acetic acid, sodium salt | 50 |
| Sodium sulfate | 50 |
| E. 7-(phenyldithio)-N,N-dimethylheptanamide | 50 |
| China clay | 48.75 |
| Alkyl aryl sulfonate | 0.75 |
| Polyvinyl alcohol | 0.5 |
| F. (p-Tolyldithio)acetic acid | 80 |
| Synthetic silica | 18.5 |
| Sodium lauryl sulfate | 0.5 |
| Sodium phenol-aldehyde sulfonate | 1.0 |

These compositions are extended with water to form sprayable formulations containing 1% by weight of the active ingredient. They are then applied using a compression type hand sprayer rig as directed post-emergence treatments in agricultural plots planted to corn and infested with broadleaf weeds. These treatments give excellent post-emergence weed control with no substantial damage to the corn crop.

Example 2

This example demonstrates the present herbicidal methods using aqueous solutions containing as active ingredients compounds of Formula 1. These solutions are prepared by slowly adding the water-soluble aryl carboxyalkyl disulfide derivatives to water under agitation, heating to hasten solution when necessary. A wetting agent is included in some of the formulations to reduce the surface tension and aid in coverage of the foliage to which the solution is to be applied.

|   | Percent |
|---|---|
| A. (Phenyldithio)acetic acid, dimethylamine salt | 30 |
| Sodium lauryl sulfate | 2 |
| Water | 68 |
| B. (2,4-dichlorophenyldithio)acetic acid, dimethylamine salt | 25 |
| Water | 75 |
| C. (2,4,5-trichlorophenyldithio)acetic acid, ammonium salt | 25 |
| Sodium N-methyl-N-oleoyl taurate | 5 |
| Water | 70 |
| D. (2,4,6-trichlorophenyldithio)acetic acid, sodium salt | 25 |
| Sodium lauryl sulfate | 2 |
| Water | 73 |
| E. (o-Chlorophenyldithio)acetic acid, sodium salt | 25 |
| Sodium lauryl sulfate | 2 |
| Water | 73 |

These aqueous solutions are diluted with water to an active ingredient content of 2% by weight. They are then applied with a sprayer mounted on a railroad car to wet the foliage thoroughly. Excellent control of sprayed weeds is obtained by this treatment.

Example 3

This example demonstrates the practice of the present method using dust herbicidal compositions. These dusts are made by first blending and grinding the active aryl carboxyalkyl disulfide with the minor absorptive diluent until the particle size of the active ingredient is substantially less than 50 microns, and then blending the mixture with the major, free flowing, dense diluent in a ribbon blender.

|   | Percent |
|---|---|
| A. (o-Chlorophenyldithio)acetic acid | 10 |
| Attapulgite, dry | 10 |
| Talc | 80 |
| B. 3-(4-chloro-o-tolyldithio)propionic acid | 20 |
| Attapulgite, dry | 20 |
| Pyrophyllite | 60 |
| C. 5-(2,4-dichlorophenyldithio)valeric acid | 10 |
| Diatomaceous earth | 10 |
| Tobacco dust | 80 |

These compositions when applied by hand around the base of telephone poles at the rate of ¼ pound/sq. rod effectively control the weeds growing in the treated area.

*Example 4*

This example demonstrates the practice of the present method using water dispersion herbicidal compositions. These water dispersions are made by combining the water insoluble aryl carboxyalkyl disulfide with the dispersant, the stabilizing agent that prevents settling and water, and then vigorously agitating the mixture.

|   | Percent |
|---|---|
| A. 6-(4-butyl-2-chlorophenyldithio)hexanamide | 30 |
| Attapulgite, hydrated | 2 |
| Sodium lignin sulfonate | 5 |
| Water | 63 |
| B. 7-(2,4-dichlorophenyldithio)-N,N-dimethylheptanamide | 30 |
| Attapulgite, hydrated | 1.75 |
| Sodium lignin sulfonate | 15 |
| Water | 53.25 |

These compositions are then extended with water to an active ingredient content of 1% by weight. They are sprayed from a truck mounted sprayer equipped with a hand gun so as to cover the weedy foliage thoroughly. This treatment gives very satisfactory control of weeds growing around an industrial installation.

*Example 5*

This example demonstates the practice of the present method using emulsifiable oil solutions of the active ingredients. These compositions are prepared by mixing the oil soluble aryl carboxyalkyl disulfide, an emulsifier and the oil vehicle and agitating until the solution is complete.

|   | Percent |
|---|---|
| A. 4-(2,4-dichlorophenyldithio)butyric acid, methyl ester | 25 |
| Polyethylene oxide modified sorbitan fatty acid ester | 5 |
| Aromatic herbicidal oil | 70 |
| B. 8-(2,4-dichlorophenyldithio)octanoic acid | 25 |
| Alkly aryl polyether alcohol | 5 |
| Alkylated naphthalene | 70 |
| C. (3-chlorophenyldithio)acetic acid, isopropyl ester | 30 |
| Polyethylene oxide modified sorbitan fatty acid ester | 10 |
| Aromatic herbicidal oil | 60 |

These oil solutions are emulsified in water to give sprayable compositions containing 2% by weight of the active ingredient. They are then sprayed as a dormant basal spray on mixed hardwood species of weeds. Excellent herbicidal control is thereby obtained.

I claim:
1. The method for the control of undesired vegetation comprising applying to the locus to be protected, in an amount sufficient to exert herbicidal action, a compound represented by the formula

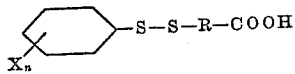

and the salts, esters and amides thereof, wherein X is selected from the group consisting of hydrogen, halogens and alkyl groups containing less than 5 carbon atoms; $n$ is a positive integer less than 4; and R is an alkylene group containing less than 8 carbon atoms.

2. A herbicidal composition comprising an inert powdered solid and, in amount sufficient to exert herbicidal action, a compound represented by the formula

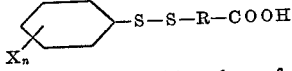

and the salts, esters and amides thereof, wherein X is selected from the group consisting of hydrogen, halogens and alkyl groups containing less than 5 carbon atoms; $n$ is a positive integer less than 4; and R is an alkylene group containing less than 8 carbon atoms.

3. The method of claim 1 wherein said compound is (phenyldithio)acetic acid.

4. The method of claim 1 wherein said compound is (p-chlorophenyldithio)acetic acid.

5. A herbicidal composition comprising an inert powdered solid and, in amount sufficient to exert herbicidal action, (phenyldithio)acetic acid.

6. A herbicidal composition comprising an inert powdered solid and, in amount sufficient to exert herbicidal action, (p-chlorophenyldithio)acetic acid.

References Cited in the file of this patent

UNITED STATES PATENTS 2,453,983   Sexton et al. ———— Nov. 16, 1948

OTHER REFERENCES

Jacini et al., in "Chemical Abstracts," vol. 46, column 4499(g), 1952.